Oct. 20, 1931. P. A. KOURTZMAN 1,828,053
SPEED LIMIT SIGNAL OR INDICATING DEVICE FOR SPEEDOMETERS FOR VEHICLES
Original Filed Jan. 31, 1929 5 Sheets-Sheet 1

Inventor:
Per Andersson Kourtzman
BY: *[signature]*
ATTORNEYS

Oct. 20, 1931.  P. A. KOURTZMAN  1,828,053
SPEED LIMIT SIGNAL OR INDICATING DEVICE FOR SPEEDOMETERS FOR VEHICLES
Original Filed Jan. 31, 1929  5 Sheets-Sheet 4

P. A. Kourtzman
INVENTOR

BY his ATTORNEYS

Oct. 20, 1931.　　P. A. KOURTZMAN　　1,828,053
SPEED LIMIT SIGNAL OR INDICATING DEVICE FOR SPEEDOMETERS FOR VEHICLES
Original Filed Jan. 31, 1929　　5 Sheets-Sheet 5

P. A. Kourtzman
INVENTOR

BY his ATTORNEYS
Ruege & Boyce

Patented Oct. 20, 1931

1,828,053

UNITED STATES PATENT OFFICE

PER ANDERSSON KOURTZMAN, OF VARTAN, SWEDEN

SPEED LIMIT SIGNAL OR INDICATING DEVICE FOR SPEEDOMETERS FOR VEHICLES

Original application filed January 31, 1929, Serial No. 336,364, and in Sweden February 8, 1928. Divided and this application filed April 1, 1930. Serial No. 440,829.

The present invention relates to speed limit signal or indicating devices for speedometers for vehicles, in which a double-armed lever is journalled, one arm of which is operated by a centrifugal device, while its other arm is provided with a signal member, which is moved to a signalling position, when the vehicle exceeds the speed limit. The characteristics of the invention resides in the fact, that the double-armed lever is slidable on its pivot or bearing pin from its normal position against the action of a spring and that the arm forming the signal member is provided with a tooth, which when the vehicle exceeds the speed limit engages a screw, which participates in the rotation of one of the figure wheels indicating the shortest distances in a counting mechanism, so that the lever slides on its pin and keeps the member in a signalling position as long as the speed limit is exceeded for a certain distance.

This application is a division of applicant's co-pending application, Serial No. 336,364, filed January 31st, 1929.

Figure 1:
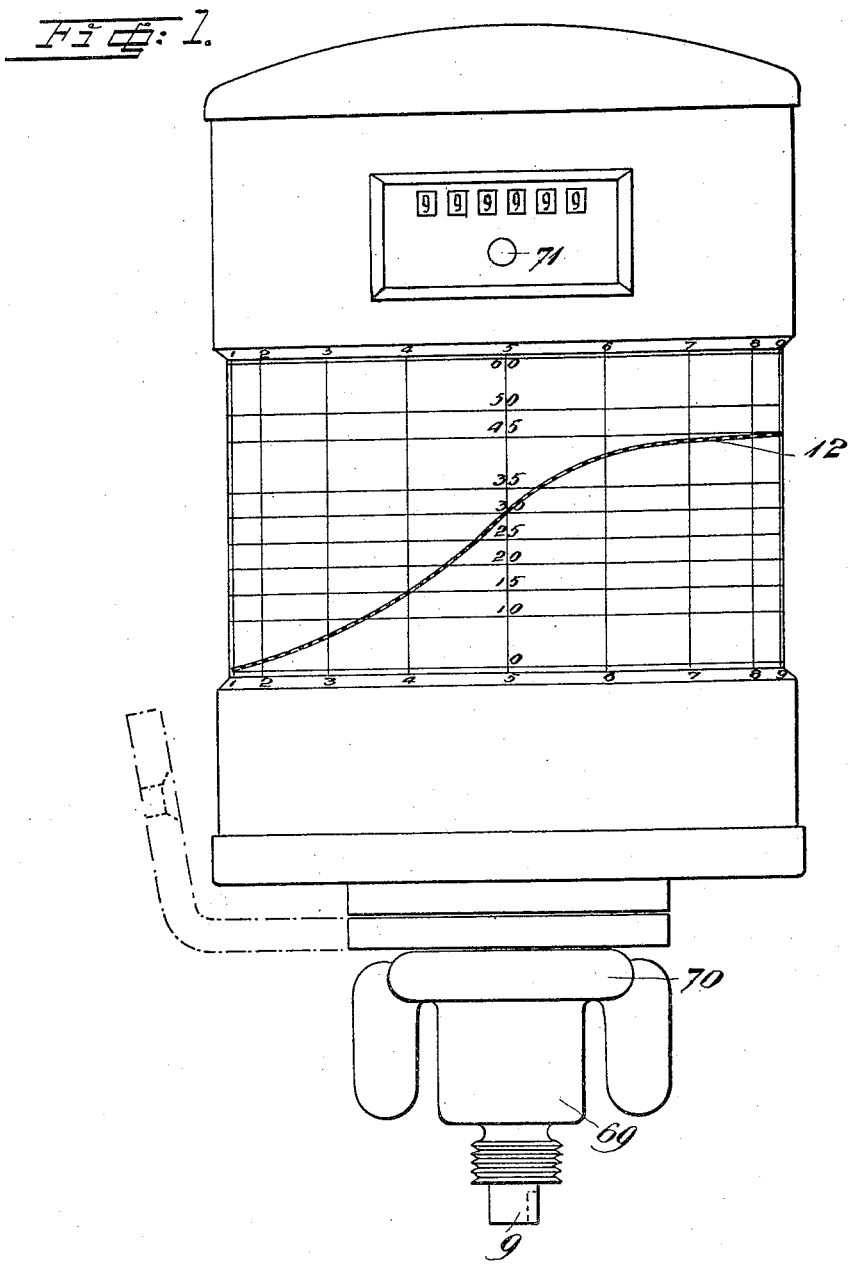
Figure 2:
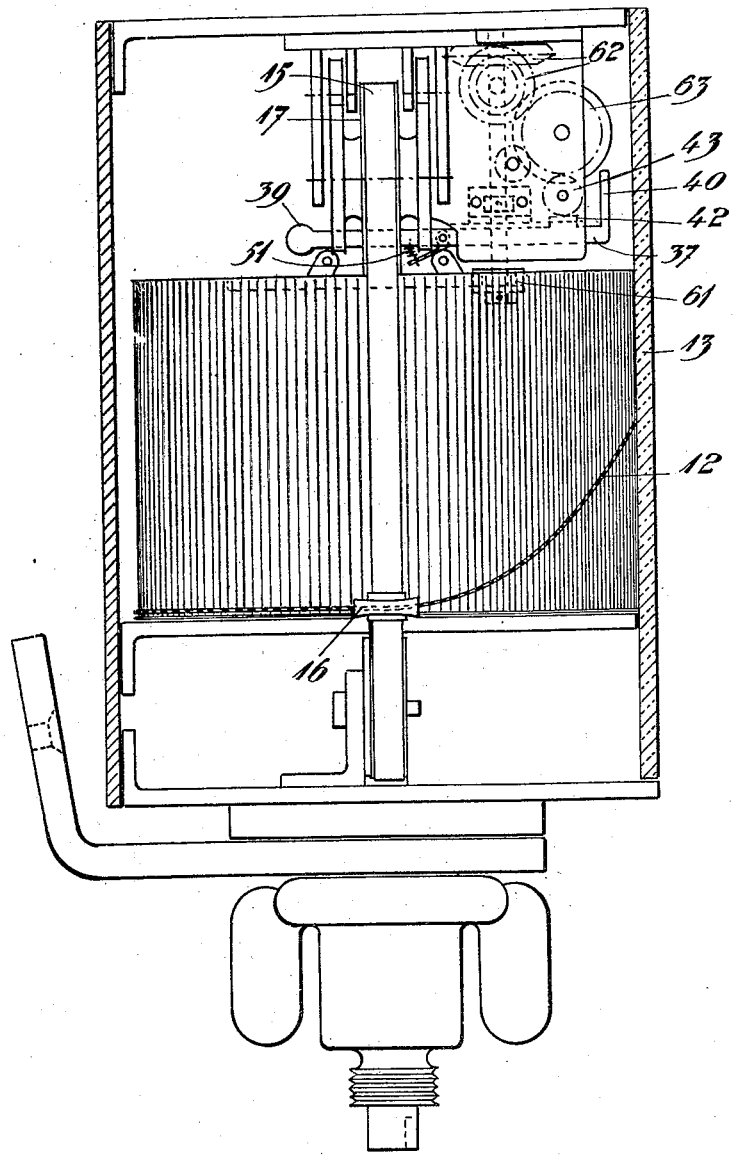
Figure 3:
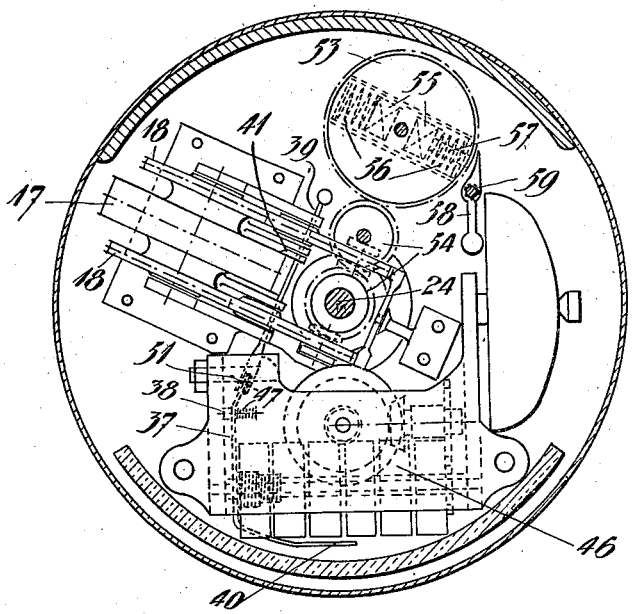
Figure 4:
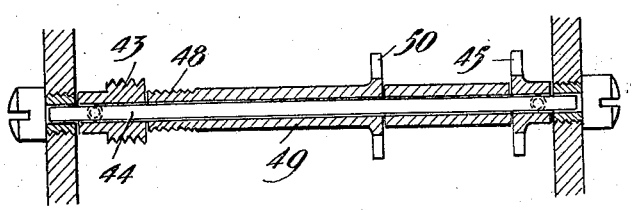
Figure 5:
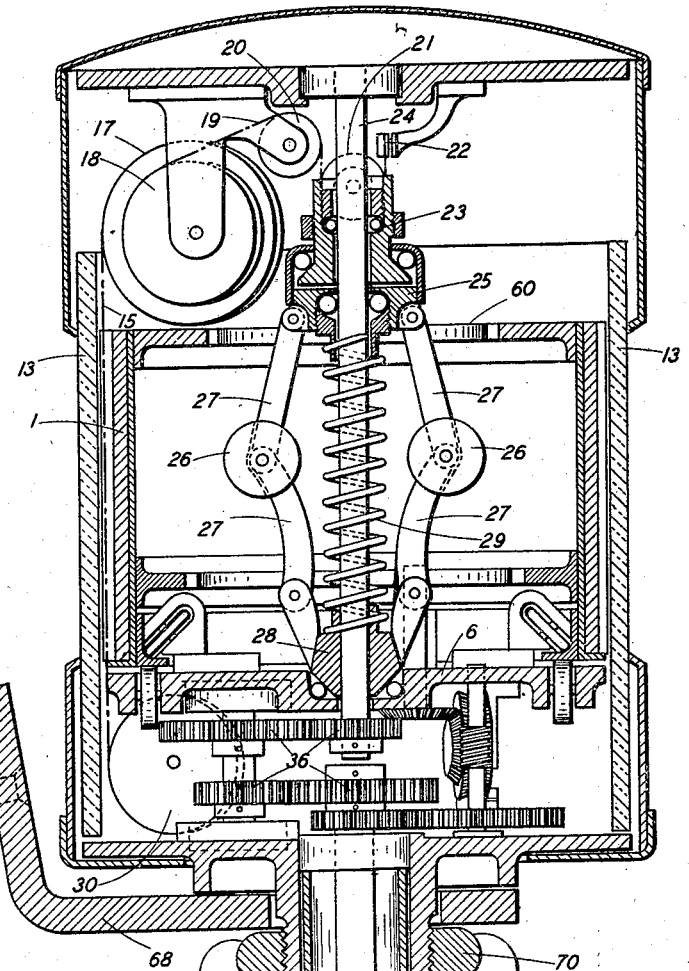
Figure 6:
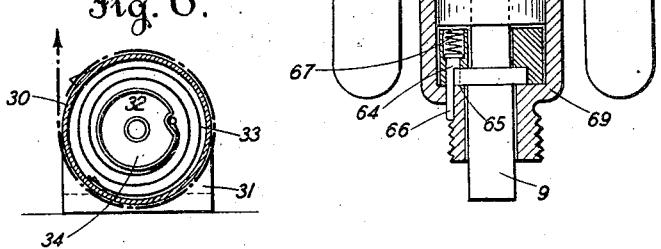
Figure 7:
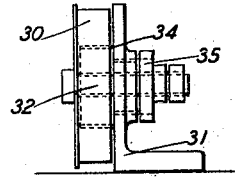
Figure 8:
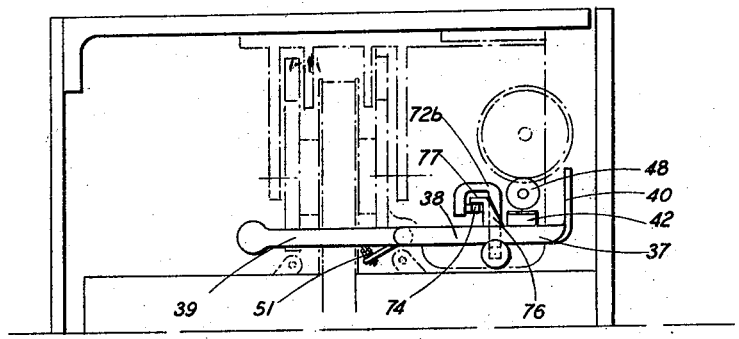
Figure 9:
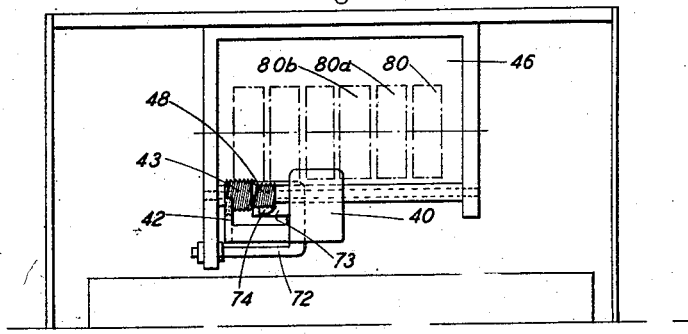
Figure 10:
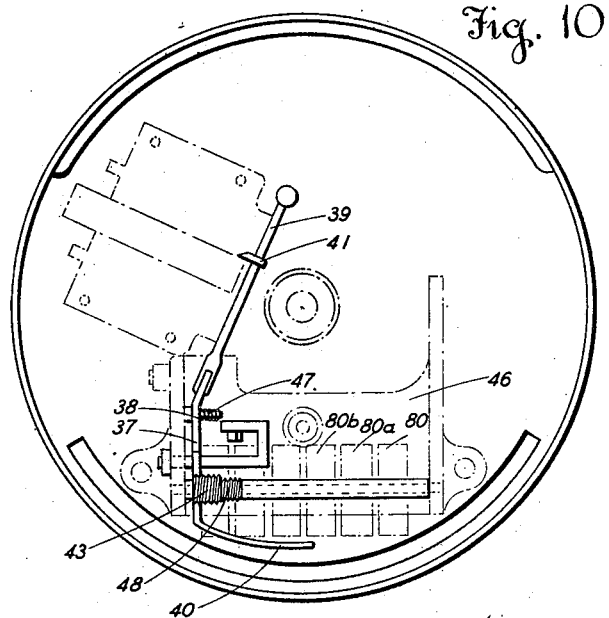
Figure 11:
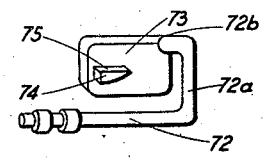

In the accompanying drawings is shown only by way of example the present invention applied to a speedometer which has a diagram cylinder with an adjustable diagram cord, a clockwork and a counting mechanism. Fig. 1 shows the apparatus in elevation. Fig. 2 shows in elevation the diagram cylinder with the diagram cord, an adjustment device for the latter, the counting mechanism and the signalling or indicating device. Fig. 3 shows the adjustment device, the signal member, the clockwork and the counting mechanism seen from above. Fig. 4 shows a detail. Fig. 5 is a vertical central section of the apparatus; Fig. 6 is a sectional side view of a spring drum forming part of the apparatus; Fig. 7 is an edge view of said drum and its bracket; Fig. 8 is a sectional view of the upper portion of the apparatus, showing in side view a double-arm lever and associated mechanism; Fig. 9 is a view taken at right angles to Fig. 8; Fig. 10 is a plan view of the mechanism shown in Figs. 8 and 9; and Fig. 11 is a perspective view of a lever-supporting bracket forming a part of the invention.

Between the diagram cylinder 1 rotating proportionally to the distance covered by the vehicle and a fixed, transparent wall 13 there is slightly pressed a diagram cord 12 participating in the rotation of the cylinder. At one of the vertical edges of the wall 13, which surrounds only a part of the diagram cylinder's circumference, there is a band 15 movable in a vertical direction close to the diagram cylinder. To this band 15 is fastened a piece of a tube 16, which carries along the cord 12 in the vertical motion of the band but permits it to run freely through the same. When the apparatus is in operation the tube 16 moves with the band 15 up or down according to the various speeds of the vehicle, and carries along with it the cord 12 participating in the rotation of the diagram cylinder. In this process the cord 12 will show a speed diagram of, by way of example, the form visible in Fig. 1. The band 15 is attached at its upper end to a drum 17 and at its lower end to a spring drum 30, mounted for rotation on a stud shaft 32 secured to a fixed bracket 31. A flat spiral spring 33 is attached at its outer end to the inner periphery of the drum 30 and at its inner end to a roller 34 loosely mounted on the stud 32 at the center of the drum. A nut 35 is provided in engagement with the stud 32 for tightening the roller 34 against the bracket 31 whereby the tension of the spring may be adjusted. The drum 17 carries a pair of pulleys or sprockets 18 to which are attached cables 19, said cables passing from the pulleys 18 over pulleys 20 journaled in fixed bearings, thence around pulleys 21, the ends of the cables being secured to a fixed bracket 22. The pulleys 21 are journaled in a sleeve 23, which is slidable on a shaft 24 journaled in concentric relation with the shaft 9 which imparts motion to the cylinder by means of suitable gearing, all of which is fully described in my said copending application. Motion is imparted to the shaft 24 from the shaft 9 by suitable gearing 36. A second sleeve 25 is mounted for sliding movement on the shaft 24 for rotation with said shaft. The sleeve 25 forms part of a centrifugal device, which comprises toggle levers 27 pivoted respectively to the sleeve 25 and a sleeve 28 encircling the lower end of the shaft 24, said latter sleeve being mounted for rotation on ball bearings carried by the fixed disk 6 disposed below the cylinder. The sleeves 23 and 25 are also preferably provided with ball bearings, as shown in Fig. 5. A spiral spring 29 is disposed on the shaft 24 between the sleeves 25 and 28. The toggles 27 carried by the sleeves 25 and 28 respectively are pivotally connected together at the center of a weight 26.

The counting mechanism 46 contains, as usual, several figure wheels 80, 80ª, 80ᵇ, etc. The figure wheel 80 makes for instance one revolution for each one hundred meters of travel of the vehicle, the figure wheel 80ª makes one revolution for each kilometer of travel, and the figure wheel 80ᵇ makes one revolution for each ten kilometers of travel, etc.

One of the arms of a double-armed lever 37, 39 journalled to a pin 38 supports the signal member 40. A projection 41 on the drum 17, on exceeding the speed limit, forces the other arm 39 of this lever downwards, so that the arm 37 is raised and the marking member 40 becomes visible in the opening 71 in Fig. 1. In this connection a tooth 42 on the arm 37 engages a thick screw 43, which is attached to a rotary shaft 44 to which is attached a cog wheel 45, geared to one of the figure wheels, for instance the wheel 80, marking the shortest distances in the counting mechanism 46. During the rotation of the shaft 44 the lever 37, 39 is in this process, on account of the tooth 42 engaging the screw 43, shifted on its pin 38 against the action of a spring 47 towards the right in Fig. 3, making the signal member visible as long as the speed limit is being exceeded. If the maximum speed lasts beyond a certain distance, the tooth 42 is moved across to a narrower screw 48 on a rotary shaft 49, on which is located a cog wheel 50, which is geared to one of the figure wheels, for instance the wheel 80ᵇ indicating a longer distance in the counting mechanism 46, after which the signal member is kept in a visible position for a certain distance, inasmuch as the lever is supported by a friction surface hereinafter described of the same length as the screw 48 so that its tooth 42 is kept in engagement with said screw. After the vehicle has covered this distance the marking member is released and returns through the action of the spring 47 to its initial position. Through the arm 39 being articulated and being actuated by a spring 51 the outer end of it can give way in the case of excessive speed, and obviate damage to the mechanism.

Supported in the frame of the counting mechanism is a bar or rod 72 in underlying relation to the lever 37 and at right angles thereto, said rod being bent first upward as indicated at 72ª, Fig. 11, and then in a direction transversely of the rod as indicated at 72ᵇ. At the end of the bent portion 72ᵇ, the rod carries an integral plate 73 disposed in a vertical plane and provided with a lug 74 projecting from one side thereof. The top surface 75 of said lug forms the friction surface hereinbefore referred to. The lever 37 is provided with an upstanding portion 76, hook-shaped at its upper end, as indicated at 77, Fig. 8, said hook-shaped end being adapted to rest on the top surface 75 of the lug 74 when the lever tooth 42 is in engagement with the screw 48. In its initial position, the lever arm 37 rests on the rod 72, with the tooth 42 out of engagement with the screw 43, which position of the lever will continue as long as the vehicle is traveling at a speed within a predetermined limit. As soon, however, as the vehicle exceeds the speed limit, the shaft 24 will rotate at such speed that the weights 26 will swing outward and pull the sleeve 23 downward so that the latter by means of the cables 19 will rotate the drum 17 toward the right in Fig. 5 sufficiently to depress the lever arm 39 by means of the projection 41, so that the member 40 will be visible through the opening 71 and the tooth 42 of lever arm 37 will engage the screw 43. As long as the speed of the vehicle is such as to cause the arm 39 to remain fully depressed, the rotating screw 43 will cause the lever 37, 39 to be shifted on its pin 38 against the action of the spring 47. If the speed decreases below the speed limit before the tooth has reached the narrower screw 48, the weights will swing inward and lift the sleeve 23 so that the wheel 17 will be rotated in the opposite direction by the band 15 and spring drum 30 and thus permit the arm 39 to rise (the arm 39 being lighter than the arm 37). The member 40 will thus descend and be invisible and the tooth 42 will disengage the screw 43 so that the lever 37, 39 will be moved on the pivot 38 to initial position under the action of the spring 47. However, if the exceeding of the speed limit continues until the screw 43 has moved the tooth 42 into engagement with the narrower screw 48 and the arm 37 into engagement with the friction surface hereinbefore described, the lever 37, 39 will be further shifted toward the right on the pin 38 against the action of the spring 47, and the arm 37 moving upon said friction surface cannot descend until it reaches the end of said surface, when the arm will drop from said surface and be returned to its initial position by the spring 47. It will thus be seen that if the exceeding of the speed limit lasts but for a short distance (for instance if it is necessary to exceed the speed limit for avoiding a collision or for passing another vehicle) the member 40 will be visible only for a short time, but that if the exceeding of the speed limit continues for some distance, the member 40 will be visible for a longer time, even if the speed decreases below the speed limit during the movement of the arm 37 upon the friction surface, because, the lever arm 37 having engaged the top surface of the lug 74, cannot descend until it has reached the end of the lug, whereupon the arm 37 will drop by gravity on to the bar 72 and under the action of the spring 47 will be returned to normal position, the lug 74 being bevelled at its underside to facilitate such return. Thus, if the top surface of the lug 74 is of the same length as the screw 48 the member 40 will be visible as long as the tooth of the lever is in engagement with said screw.

53, 54, 55, 56, 57, 58, 59 are parts of the clockwork, which is operated by the shaft 24 of the centrifugal device. The counting mechanism 46 is operated by the diagram cylinder through the agency of a toothed ring 60, Fig. 5, inside the same engaging a cogwheel 61, Fig. 2, two cooperating bevelled wheels 62 and a cogwheel 63 cooperating with the cogwheel 45. In Figs. 1 and 5, the reference characters 64 to 70 designate details which form no part of the invention.

The separate parts of the apparatus shown may of course be varied in many ways, provided only the characteristics of the invention are retained. The apparatus can be used on many different kinds of vehicles, e. g. motor cars, locomotives, etc.

What I claim is:—

1. In a speedometer for vehicles, a pivoted lever, a signalling device carried by said lever, means rotatable at a speed proportionate to the speed of travel of the vehicle and adapted to actuate said lever to move said signalling device into signalling position when the speed of the vehicle exceeds a predetermined limit, and means operative to retain the signalling device in said position during travel of the vehicle over a predetermined distance after the lever-actuating means has become ineffective.

2. In a speedometer for vehicles, a pivoted lever, a signalling device carried by said lever, centrifugal means rotatable at a speed proportionate to the speed of travel of the vehicle and adapted to swing said lever on its pivot thereby to move said signalling device into signalling position when the speed of the vehicle exceeds a predetermined limit, and means independent of said centrifugal means and operative to retain the signalling device in said position during travel of the vehicle over a predetermined distance after the lever-actuating means has become ineffective.

3. In a speedometer for vehicles, a pivoted lever adapted to move axially of its pivot, a spring for retaining said lever in its normal position, a signalling device carried by the lever and normally out of sight, means rotatable at a speed proportionate to the speed of the vehicle and adapted to swing said lever on its pivot when the speed of the vehicle exceeds a predetermined limit thereby to disclose said signalling device, means for moving said lever axially of its pivot, and means for retaining said lever in its signal-disclosing position during travel of the vehicle over a predetermined distance after the lever-swinging means has become ineffective.

4. In a speedometer for vehicles, a pivoted lever adapted to move axially of its pivot, a spring for retaining said lever in its normal position, a signalling device carried by the lever and normally out of sight, means rotatable at a speed proportionate to the speed of the vehicle and adapted to swing said lever on its pivot when the speed of the vehicle exceeds a predetermined limit thereby to disclose said signalling device, a pair of coaxially disposed screws geared for rotation at different speeds proportionate to the speed of travel of the vehicle, means carried by said lever and adapted to cooperate with said screws for moving said lever axially of its pivot when in signal-disclosing position, and means for retaining the lever in said position during travel of the vehicle over a predetermined distance after the lever-swinging means has become ineffective.

In testimony whereof I have signed my name to this specification.

PER ANDERSSON KOURTZMAN.